United States Patent [19]

Zingel et al.

[11] Patent Number: 4,901,626
[45] Date of Patent: Feb. 20, 1990

[54] HYDRAULIC POWER BOOSTER

[75] Inventors: Heinz Zingel, Bad Camberg; Thomas Bartsch, Kelkheim, both of Fed. Rep. of Germany

[73] Assignee: Alfred Teves GmbH, Frankfurt am Main, Fed. Rep. of Germany

[21] Appl. No.: 216,583

[22] Filed: Jul. 7, 1988

[30] Foreign Application Priority Data

Jul. 30, 1987 [DE] Fed. Rep. of Germany ....... 3725249

[51] Int. Cl.$^4$ ............................................. F15B 9/10
[52] U.S. Cl. ...................................... 91/369.1; 91/371
[58] Field of Search .................. 91/384, 369.1, 374, 91/371; 60/547.1

[56] References Cited

U.S. PATENT DOCUMENTS

| | | |
|---|---|---|
| 3,470,697 | 10/1969 | Pech et al. ........................ 91/369.1 |
| 3,898,808 | 8/1975 | Ewald . |
| 4,240,330 | 12/1980 | Farr .................................. 91/369.1 |
| 4,377,105 | 3/1983 | Fecher . |
| 4,462,300 | 7/1984 | Belart ................................... 91/384 |
| 4,642,990 | 2/1987 | Mizusawa et al. ................. 91/369.1 |
| 4,776,256 | 10/1988 | Gath et al. ............................ 91/384 |

FOREIGN PATENT DOCUMENTS 456356 7/1968 China .
3006200 9/1980 Fed. Rep. of Germany .
3136975 4/1983 Fed. Rep. of Germany .
3312192 10/1984 Fed. Rep. of Germany .
3338248 5/1985 Fed. Rep. of Germany .
3542418 6/1987 Fed. Rep. of Germany .
3542602 6/1987 Fed. Rep. of Germany .
3600925 7/1987 Fed. Rep. of Germany .

Primary Examiner—Edward K. Look
Attorney, Agent, or Firm—Robert P. Seitter

[57] ABSTRACT

The invention relates to a hydraulic power booster, in particular for the actuation of a master cylinder in a hydraulic brake system for motor vehicles. The booster comprises a pressure fluid source, a control device for the control of the pressure level in a booster pressure chamber, an actuating element for the actuation of the control device which actuating element is acted upon by an input force, a converting device for the conversion of the hydraulic pressure into a translatory force which converting device is acted upon by a pressure fluid, and a force transmission element which, preferably is an operating rod for a tandem master cylinder. A semi-rigid force transmission element is arranged in the structure for the transmission of force from the actuating element to the force transmission element in order to obtain a two-stage effect.

10 Claims, 2 Drawing Sheets

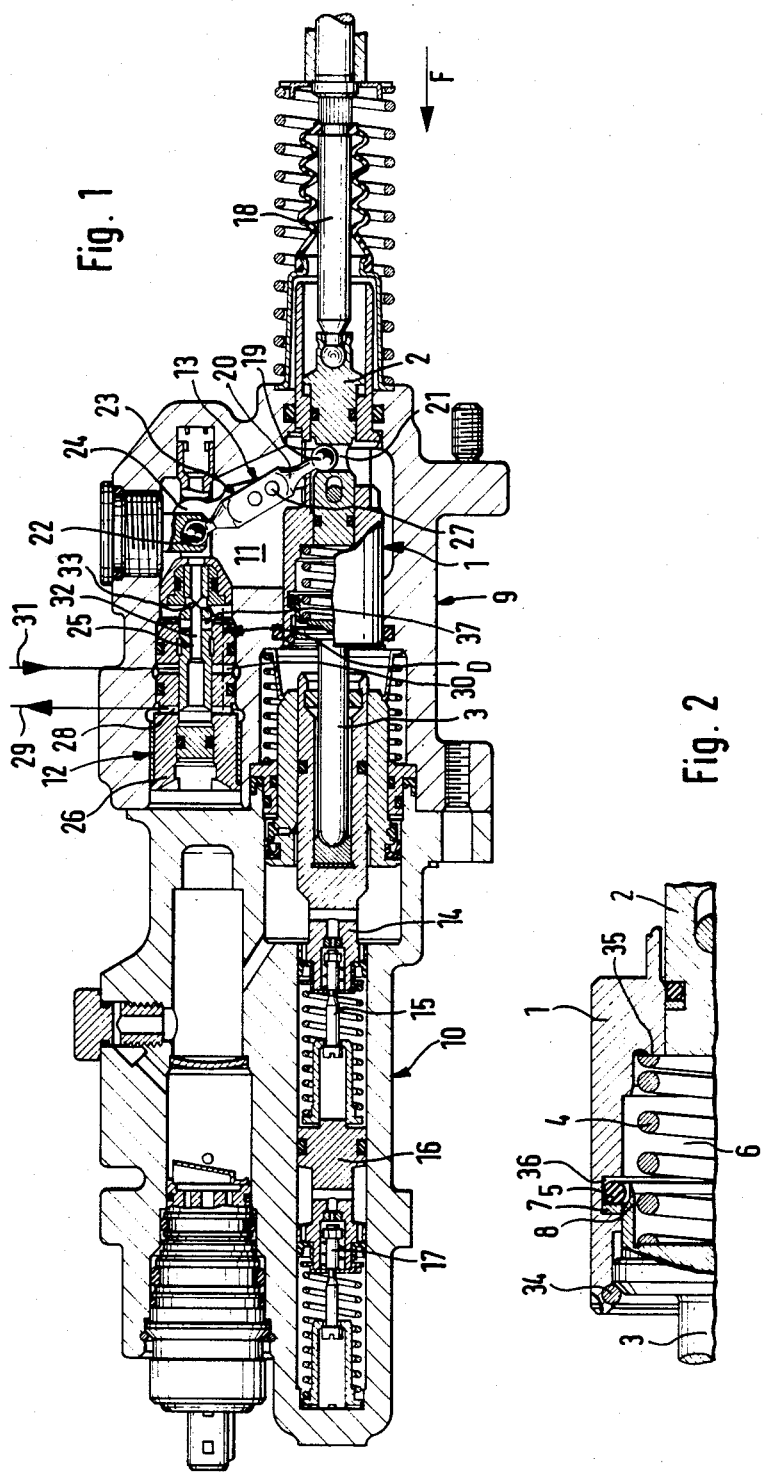

HYDRAULIC POWER BOOSTER

BACKGROUND OF THE INVENTION

The present invention relates to a hydraulic power booster for the actuation of a master cylinder in a hydraulic brake system for motor vehicles having a pressure fluid source. The invention relates to a hydraulic booster including a control device for the control of the hydraulic pressure level in a booster pressure chamber, an actuating element for the actuation of the control device wherein the actuating element is acted upon by an input force, a device for converting the hydraulic pressure into a translatory force wherien the converting device is acted upon by a pressure fluid and a force transmission element for transmitting the translatory force onto other force transmission elements connected to the master cylinder.

Hydraulic power boosters of this type are being used in increasingly large numbers in hydraulic actuating systems for motor vehicle brakes. They are used in particular as power boosters in anti-lock control systems and traction slip control systems for motor vehicles.

In automobile design, the hydraulic brake power booster competes with the conventional vacuum brake power booster.

The vacuum brake power booster still has certain advantages over the hydraulic brake power booster, in particular in view of its operating convenience. On the other hand, the hydraulic brake power booster has become indispensable in many fields of application.

There is, therefore, a need to improve the operating convenience of the hydraulic brake power booster so that it will at least meet and preferably exceed the operating convenience of the vacuum brake power booster.

When comparing the differences in convenience more closely one will note that in conventional hydrualic brake power boosters, as compared with vacuum brake power boosters, a dull pedal feel is often encountered in the lower working range. This is due to the fact that higher response forces must be produced in the hydraulic brake power booster as compared with the vacuum brake power booster during the initial phase of the brake actuation.

During the development of the vacuum brake power booster, the same problem was also encountered in the vacuum brake power booster. The problem was solved by a structure known as the so-called two-stage effect, or two-stage function.

This two-stage function of the vacuum brake power booster can also be put into practice according to the following design:

By applying only a very low actuating force onto the brake pedal, first a valve is opened in the vacuum brake power booster in order to initiate the vacuum booster function of the vacuum brake power booster. The servo force thus generated actuates the tandem master cylinder. An initial pressure of approx. 5 bar is built up in the hydrualic brake circuits.

This initial pressure build-up is thus achieved without any significant physical exertion, that is, without a significant pedal force and the pedal actuation is correspondingly relatively easy.

The driver will only note the actual reaction force at the brake pedal upon completion of the two-stage function.

In a known design, a reaction disc made of rubber is clamped between the valve piston of the vacuum brake power booster and the operating rod of the tandem master cylinder piston.

Upon actuation of the brake pedal, the pedal force is transmitted from the brake pedal by the pedal piston rod and the actuating piston of the vacuum brake power booster onto the rubber reaction disc. The force deforms the rubber reaction disc. The degree of deformation is predetermined and occurs in an axial direction. In automotive brake engineering, this predetermined degree of deformation is called "Z-measure" and is one of the design parameters for brake power boosters.

After the "Z-measure" has been overcome, the actual vacuum brake power booster function starts. The booster increases the pressure in the tandem master cylinder and thus in the hydraulic actuating system in dependence upon the input force, that is, the pedal force.

In the known device, the degree of two-stage effect can be set and depends on the Shore hardness of the rubber of the reaction disc and on the "Z-measure".

The German printed and published patent application P 3542418.4 (corresponding to U.S. Pat. No. 4,750,406 issued June 14, 1988) discloses a hydraulic booster for the actuation of master cylinders in motor vehicle brake systems. This booster has been designed such that the booster piston is provided with a bore at its end opposite the pedal wherein an auxiliary piston is longitudinally displaceably and sealingly arranged, which auxiliary piston is effectively connected with the piston of the master cylinder and confines, together with the booster piston, a chamber which communicates with the booster chamber through a channel provided in the booster piston.

SUMMARY OF THE INVENTION

The object of the present invention is to provide for an improved hydraulic power booster of the type disclosed in the German printed and published patent application P 3542418.4.

According to the present invention, a reduction of the response forces in the lower pressure range and thus an improvement in pedal feel during braking in the lower pressure range is achieved. The tandem master cylinder pressure is developed in dependence upon the input force according to a two-stage function at low input forces.

According to the invention, a semi-rigid force transmission unit is arranged between a converting device and a force transmission element of the hydraulic power booster.

According to a preferred embodiment of the present invention, a closable fluid reservoir is arranged between a converting device and a force transmission element wherein the fluid reservoir acts as pressure cushion and functions as a pressure reservoir only after a specific input force has been reached whereupon the pressure fluid column in the pressure reservoir then serves to transmit a translatory force.

In the lower working range, the response forces are clearly reduced as compared to known hydraulic power boosters due to the insertion of the cushion according to the invention. The pedal feel of a hydraulic power booster becomes correspondingly easier in the lower working range.

The present invention provides for modification of the transmission ratio of the booster. For that purpose, only the diameter of the acutating piston need be changed. To the contrary, in known hydraulic brake power boosters, a plurality of piston diameters must be changed.

The use of a hydraulic pressure cushion according to the invention is a, literally speaking, clean solution as compared with using a rubber reaction disc in a hydrualic brake power booster. A rubber reaction disc is subject to permanent wear. The rubbed-off particles of the rubber body get into the hydraulic channels of the booster system and the other hydraulic actuating systems of the brake. This may cause malfunctions and even the fialure of the total brake system. This is especially the case when the hydraulic brake system comprises the complex channel system of an anti-lock control system and a traction slip control system. This problem is particularly important because the rubber reaction is surrounded by brake fluid in the hydraulic brake power booster.

Hydrualic power boosters must have a long service life due to the great number of force cycles. This requirement cannot be met in the esired manner by the use of a rubber reaciton disc. Under present difficult operating conditions, high rubber compressions are to be expected which reduce the life of the rubber reaction disc considerably.

When using rubber reaction discs, there is also the special danger of a brake fluid leakage within the area of the rubber reaction disc so that impurities can get into the brake system.

As is generally known, the physical properties of a rubber body depend to a very strong degree on temperature. For this reason too, the rubber reaction disc is a problematic component when being used in a hydraulic power booster.

The disadvantages described above are avoided by the structure of the present invention.

According to an important aspect of the invention, that amount of the input force which does not contribute to initiating functioning is predetermined by means of a preloaded spring element. The arrangement is such that a closure member is provided which clsoes the fluid reservoir in a sealing manner in opposition to the force of the preloaded spring element upon reaching a predetermined input force.

According to another aspect of the present invention, the fluid reservoir is arranged inside the converting device. The fluid reservoir can be defined by the actuating element, the converting device and the force transmission element.

According to a further important feature of the present invention, the force transmission element can take over the function of the closure member for the fluid reservoir. When the hydraulic power booster is in the inoperative position, the closure member is under the effect of the preloaded compression spring. The spring maintains the closure member in its initial position in which the fluid reservoir is open, that is, unpressurized.

A particularly advantageous construction of the present invention provides for the converting device to include a converting pistion which is provided with a cylindrical interior. The interior is, at its one end, designed as a guiding means for the actuating element. The guiding means also functions as a seal. At its other end, the interior is part of a seal by means of which the interior can be closed after a specific input force has been reached.

The seal itself, which can thus assume an open and a closed state, is, according to a preferred embodiment, designed such taht an elastic sealing element in the form of an O-ring/back-ring combination is accommodated in an annular groove in the inner wall of the converting piston. When the converting piston moves toward the force transmission element, the sealing element is selaingly moved onto the ramp-shaped end of the force transmission element, in opposition to the force of the preloaded compression spring.

If the hydraulic power booster is used as a brake power booster for a motor vehicle, the actuating element can be shaped in the form of an actuating piston or control piston of the booster with the actuating piston being moved by means of the pedal force and controlling the hydraulic pressure level in the booster chamber. The force transmission element can be formed as an operating rod for operating a tandem master cylinder.

BRIEF DESCRIPTION OF THE DRAWING

The subject matter of the invention can be embodied in various designs. A preferred hydraulic brake power booster will be described in more detail in the following Detailed Description of a Preferred Embodiment with reference to the Drawings wherein:

FIG. 1 is an axial cross-sectional view of a hydraulic brake power booster according to the invention shown with a tandem master cylinder;

FIG. 2 is a cross-sectional view of a portion of the hydraulic brake power booster according to FIG. 1 showing details of construction;

DETAILED DESCRIPTION OF A PREFERRED EMBODIMENT

Figure 3:
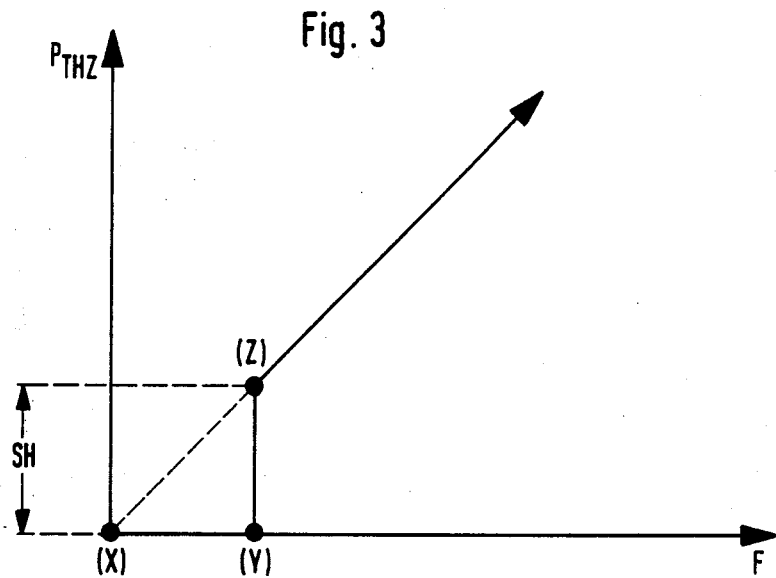
FIG. 3 is a graph showing the operation of the hydraulic brake power booster.

In FIG. 1, the brake power booster is referred to generally as 9. The tandem master cylinder is designated generally with the reference numeral 10. The hydraulic brake power booster and the tandem master cylinder are arranged coaxially and are bolted together through the intermediary of flanges. The hydraulic brake power booster housing includes a hydraulic pressure chamber 11, a control valve 12 for the control of the hydraulic pressure in the chamber 11, a double-lever mechanism which is referred to in general as 13, a boosting or converting piston 1 and an actuating piston 2. The tandem master cylinder 10 has a conventional design. Its housing accommodates an operating rod piston 14, central valve 15 and the intermediate piston 16 with its central valve 17.

The operation of the individual components of the hydraulic brake power booster will be described in more detail:

Upon actuation of the brake pedal, a force F is exerted onto the operating rod 18. The operation rod moves the actuating piston 2 to the left as viewed in FIG. 1. The lower end 19 of a first lever 20 is arranged in a recess 21 in the actuating piston 2. Due to the movement of the actuating piston to the left, the lever 20 is moved clockwise. The upper end 22 of the first lever is stationary.

Reference number 23 refers to a second lever. The upper end 24 of the second lever is accommodated in a recess in the extension of the control gate. The control gate is referred to as 25. The control gate as such is displaceably arranged inside the control gate housing 26.

The first lever 20 and the second lever 23 are tiltingly connected with each other by way of a common joint 27.

If, due to the movement of the actuating piston 2 to the left, the first lever 20 is turned clockwise, it entrains the second lever 23 by way of the joint 27. The lower end of the second lever 23 bears against the converting piston 1. This bearing must be considered as a momentarily firm bearing realtive to the second lever 23. Due to the clockwise movement, as viewed in the Drawing, of the first lever 20, and due to the fact that the second lever 23 is entrained by the first lever 20, the second lever 23, therefore, makes a counterclockwise movement. Accordingly, the upper end 24 of the second lever 23 displaced the control gate 25 to the left.

In FIG. 1, the control gate 25 is illustrated with the brakes assuming the inoperative position. If the control gate 25 is displaced to the left, its left control edge closes the unpressurized pressure discharge line 28 which is accommodated in the control gate housing 26. The pressure fluid discharge is illustrated by the arrow 29. The pressure fluid discharge is thus interrupted. If the actuating piston 2 is, due to the pedal force and/or the input force F, moved further to the left, the first lever 20 is further swivelled clockwise. The upper end 24 of the second lever 23 is further turned to the left, in a counterclockwise manner through the intermediary of the joint 27, and the control gate 25 moves further to the left and overcomes the distance commonly referred to as "positive overlapping" in hydraulic engineering. After having overcome this "overlapping distance", the pressure line 30 accommodated in the control gate housing 26, is released. The release is effected by means of a radial bore 37 provided in the control gate 25. The pressure fluid supply is illustrated by the arrow 31. Pressure fluid now flows through the axial bore 32 and the radial bore 33 in the control gate 25 into the hydraulic pressure chamber 11.

Figure 4:
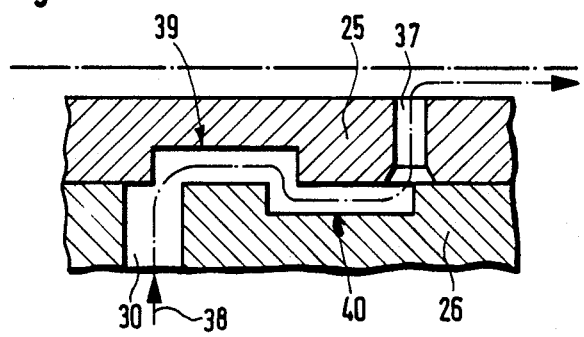
FIG. 4 is an enlarged cross-sectional view of detail D of FIG. 1 showing details of construction.

In FIG. 4, the flow of the pressurized pressure fluid into the pressure chamber is illustrated by the broken line 38. The annular groove 39 is provided in the control gate 25 and the annular groove 40 is provided in the control gate housing 26. The annular groove 39 in the control gate connected the pressure fluid supply line 30 with the annular groove 40 in the control gate housing. This annular groove 40, in turn, establishes a connection with the radial bore 37 in the control gate. The pressure fluid is transmitted into the axial bore of the control gate through the radial bore 37, see FIG. 1, and from there into the pressure chamber.

Under the effect of the hydraulic pressure in the pressure chamber 11, the converting piston 1 is moved to the left.

The actuating piston 2, the double-lever mechanism 13, the control gate 25 and the converting piston 1 constitute in their entirety a so-called "follow-up mechanism", that is, a follow-up system. Namely, if the actuating piston 2 is moved to the left, the converting piston 1 is moved to the left due to the increased pressure level in the chamber 11.

The converting piston 1 actuates the pistons 14, 16 of the tandem master cylinder 10 by way of the operating rod 3. First, the central valves 15, 17 are closed and then the brake pressure is built up. The pressure in the tandem master cylinder 10 is a function of the pedal force, and/or the input force F, at the actuating piston 2. Master cylinder pressure is built up in dependent upon the input force according to the invention by means of a two-stage function.

FIGS. 2 and 4 illustrate this two-stage function.

FIG. 2 shows an enlarged illustration of the converting piston 1 and of the components cooperating therewith. In FIG. 2, all parts are shown in the inoperative braking position. The operation rod 3 is urged against the stop 34 by means of the compression spring 4. The compression spring 4 bears against a step 35 inside the converting piston 1. The compression spring 4 is preloaded.

An annular groove 36 is provided in the inner wall of the converting pistion 1, and receives an O-ring 5 and a back-ring 7. Corresponding to the O-ring/back-ring combination, the end of the operating rod 3 takes the form of a ring-shaped ramp 8.

FIG. 2 shows an open, that is, unpressurized illustration of the interior of the converting piston since the ramp 8 and the O-ring 5 have not yet achieved a sealing abutment.

A slight actuation of the pedal produces a correspondingly slight input force F. In the diagram shown in FIG. 3, the value of the input force indicated on the absciss is increased from $X = O$ toward $Y$.

The actuating piston 2, which is, at first, pressure-compensated and thus free of forces, moves to the left as viewed in the Drawing, when the input force is slightly increased. Due to this movement to the left, the actuating piston 2 opens the pressure fluid supply 31 by way of the double-lever mechanism 13 and the gate valve 25 in the manner described above. The hydraulic pressure level in the pressure chamber 11 of the booster thus increases. Under the effect of this increasing pressure level, the converting piston 1 is moved to the left. The O-ring 5 and the corresponding ramp 8 achieve a sealing abutment. The chamber 6 has become a pressure chamber. The fluid column existing in the pressure chamber becomes a force-transmitting medium.

The function of the tandem master cylinder pressure is dependent on the input force F and is thus delayed. In the pressure diagram of FIG. 3, the value of the input force F has, in the meantime, reached the value Y. At the same time, the pressure in the tandem master cylinder jumps to the magnitude SH (Magnitude of the two-stage function). The starting point of the tandem master cylinder pressure which is dependent on the input force F is characterized by the position Z in the diagram. The tandem master cylinder pressure rises proportionally to the input force F from Z.

The preload force of the spring 4 between the converting piston and the operating rod must be overcome during the operations described above. The preload force of the spring 4 is exceeded the moment a sufficiently high tandem master cylinder pressure is produced which causes the operating rod 3 to perform the relative movement to the piston as described above, which movement leads to the sealing of the pressure chamber 6.

Thus, the preload force of the compression spring 4 determines the magnitude of the two-stage function SH.

Only one embodiment of the invention has been described herein. The invention can however be embodied in further embodiments and modifications. The sealing of the pressure chamber 6, for example, can also be achieved by means of a cup, a central valve by means of other sealing elements.

What is claimed is:

1. A hydraulic power booster for the actuation of a master cylinder in a hydraulic brake system of a motor vehicle, said brake system including a pressure fluid source, comprising a control device for the control of the hydraulic pressure level in a booster pressure chamber of said power booster, an actuating element connected for the actuation of the control device, said actuating element adapted to be acted upon by an input force, a converting device connected for the conversion of the controlled hydraulic pressure into a translatory force including a converting element adapted to be acted upon by said controlled pressure fluid, and a force transmission element connected for the transmission of the translatory force to the master cylinder, wherein a semi-rigid force transmission unit is arranged between the converting device and the force transmission element, a closable fluid reservoir, means responsive to said input force for closing said fluid reservoir wherein said fluid reservoir is closed to define a pressure reservoir and provide a pressure cushion after a specific input force has been reached.

2. A hydraulic power booster for the actuation of a master cylinder in a hydraulic brake system of a motor vehicle, said brake system including a pressure fluid source, comprising a control device for the control of the hydraulic pressure level in a booster pressure chamber of said power booster, an actuating element connected for the acutation of the control device, said actuating element adapted to be acted upon by an input force, a converting device connected for the conversion of the controlled hydraulic pressure into a translatory force including a converting element adapted to be acted upon by said controlled pressure fluid, and a force transmission element connected for the transmission of the translatory force to the master cylinder, wherien a semi-rigid force transmission unit is arranged between the converting device and the force transmission element, and wherein a closable fluid reservoir is arranged between the converting device and the force transmission element, said fluid reservoir defining a pressure cushion adapted to be closed and define a pressure reservoir after a specific input force has been reached, the pressure fluid of said pressure reservoir transmitting the translatory force.

3. The hydraulic power booster according to claim 2, further including a closure member adapted to close the fluid reservoir in a sealing manner in opposition to a force of a preloaded spring element at a predetermined input force.

4. The hydraulic power booster according to claim 3, wherein the fluid reservoir is arranged inside the converting device.

5. The hydraulic power booster according to claim 4, wherein the actuating element, the converting device and the force transmission element confine the fluid reservoir.

6. The hydraulic power booster according to claim 5, wherein the force transmission element defines the closure member for the fluid reservoir and is held in an initial position in which the fluid reservoir is amintained open by means of the preloaded compression spring acting on said closure member when the hydraulic booster is in an inoperative position.

7. The hydraulic power booster according to claim 6, wherein the converting device comprises a converting piston with a cylindrical interior.

8. The hydraulic power booster according to claim 7, wherein the interior of the converting piston sealingly guides the actuating element, at its one end and the opposite end of said converting piston with the force transmission member define a closeable seal.

9. The hydraulic power booster according to claim 8, wherein an elastic sealing element in the form of an O-ring/back-ring combination is accommodated in an annular groove in an inner wall of the converting piston, said sealing element is sealingly moved onto a ramp-shaped end of the force transmission element in opposition to the force of the preloaded compresion spring, when the converting piston moves toward the force transmission element.

10. The hydraulic brake power booster for motor vehicles according to claim 9, wherein the actuating element is shaped in the form of an actuating piston of the hydraulic brake power booster, the actuating piston being moved by emans of a pedal force, the force transmission element defining an operating rod for a tandem master cylinder.

* * * * *